US012597599B2

(12) United States Patent
Liao

(10) Patent No.: US 12,597,599 B2
(45) Date of Patent: Apr. 7, 2026

(54) NEGATIVE ELECTRODE MATERIAL AND ELECTROCHEMICAL APPARATUS AND ELECTRONIC APPARATUS CONTAINING SAME

(71) Applicant: Ningde Amperex Technology Limited, Ningde (CN)

(72) Inventor: Qunchao Liao, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 778 days.

(21) Appl. No.: 17/708,266

(22) Filed: Mar. 30, 2022

(65) Prior Publication Data

US 2022/0223853 A1     Jul. 14, 2022

Related U.S. Application Data

(63) Continuation of application No. PCT/CN2019/128840, filed on Dec. 26, 2019.

(51) Int. Cl.
| *H01M 4/38* | (2006.01) |
| *H01M 4/36* | (2006.01) |
| *H01M 4/583* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/386* (2013.01); *H01M 4/366* (2013.01); *H01M 4/583* (2013.01); *H01M 4/622* (2013.01); *H01M 4/625* (2013.01); *H01M 10/0525* (2013.01); *H01M 2004/021* (2013.01); *H01M 2004/027* (2013.01)

(58) Field of Classification Search
CPC ........... H01M 4/386; H01M 2004/027; H01M 2004/021; H01M 10/0525; H01M 4/583
See application file for complete search history.

(56) References Cited

U.S. PATENT DOCUMENTS

| 2010/0159331 | A1* | 6/2010 | Lee .......................... H01B 1/24 |
| | | | 977/773 |
| 2017/0271723 | A1* | 9/2017 | Huang .............. H01M 10/0525 |

FOREIGN PATENT DOCUMENTS

| CN | 101243566 | B | 5/2010 |
| CN | 102013471 | A | 4/2011 |
| CN | 103137952 | A | 6/2013 |
| CN | 103887507 | A | 6/2014 |

(Continued)

OTHER PUBLICATIONS

Cook et al, Tuning Porosity and Surface Area in Mesoporous Silicon for Application in Li-Ion Battery Electrodes. Applied Materials and Interfaces, 2016. (Year: 2016).*

(Continued)

*Primary Examiner* — Haixia Zhang
(74) *Attorney, Agent, or Firm* — Maier & Maier, PLLC

(57) ABSTRACT

A negative electrode material includes silicon-based particles. The silicon-based particle includes a silicon-containing matrix and a polymer layer, and the polymer layer is located on a surface of at least a part of the silicon-containing matrix and contains carbon nanotubes and a transition metal element. A lithium-ion battery prepared from the negative active material has improved cycle performance, deformation resistance and rate performance and reduced impedance.

19 Claims, 3 Drawing Sheets

(56)    References Cited

FOREIGN PATENT DOCUMENTS

| | | | | | |
|---|---|---|---|---|---|
| CN | 104471752 A | * | 3/2015 | .......... | H01M 4/0404 |
| CN | 105283986 A | * | 1/2016 | .......... | C01B 33/113 |
| CN | 104885269 B | | 4/2017 | | |
| CN | 108321368 A | | 7/2018 | | |
| CN | 109301184 A | | 2/2019 | | |
| CN | 109638254 A | | 4/2019 | | |

OTHER PUBLICATIONS

Zhou et al—A universal synthetic route to carbon nanotube/transition metal oxide nano-composites for lithium ion batteries and electrochemical capacitors. Scientific Reports, 2016 (Year: 2016).*
Cong R et al, Characteristics and electrochemical performances of silicon/carbon nanofiber/graphene composite films as anode materials for binder-free lithium-ion batteries. Sci Rep. Jan. 14, 2021;11(1):1283. doi: 10.1038/s41598-020-79205-1. (Year: 2021).*
Majid et al A review on transition metal doped silicon carbide, May 2019 (Year: 2019).*
International Search Report mailed Sep. 27, 2020, corresponding to International Application No. PCT/CN2019/128840; 5 pages (with English translation).
First Office Action issued Oct. 10, 2020, corresponding to Chinese Application No. 201911370848.2; 14 pages (with English Translation).
Second Office Action issued Mar. 15, 2021, corresponding to Chines Application No. 201911370848.2; 12 pages (with English Translation).

* cited by examiner

NEGATIVE ELECTRODE MATERIAL AND ELECTROCHEMICAL APPARATUS AND ELECTRONIC APPARATUS CONTAINING SAME

CROSS-REFERENCE TO RELATED APPLICATIONS

The present application is a bypass continuation application of PCT application PCT/CN2019/128840, filed on Dec. 26, 2019, the disclosure of which is incorporated by reference in its entirety.

TECHNICAL FIELD

This application relates to the field of energy storage, and in particular to a negative electrode material and an electrochemical apparatus and an electronic apparatus containing the same, especially a lithium-ion battery.

BACKGROUND

As consumer electronic products such as notebook computers, mobile phones, tablet computers, mobile power supplies and drones are popularized, requirements for electrochemical apparatuses have become more and more stringent. For example, batteries are not only required to be light but also required to have high capacity and long service life. Lithium-ion batteries have occupied the mainstream position in the market due to outstanding advantages such as high energy density, high safety, no memory effect and long service life.

SUMMARY

In the embodiments of this application, a negative electrode material is provided to try to resolve at least one problem in the related field to at least some extent. In the embodiments of this application, a negative electrode, an electrochemical apparatus and an electronic apparatus using the negative electrode material are also provided.

In an embodiment, this application provides a negative electrode material. The negative electrode material includes silicon-based particles, where the silicon-based particle includes a silicon-containing matrix and a polymer layer, and the polymer layer is located on a surface of at least a part of the silicon-containing matrix and contains carbon nanotubes and a transition metal element.

In another embodiment, this application provides a negative electrode, including the negative electrode material according to the embodiments of this application.

In another embodiment, this application provides an electrochemical apparatus, including the negative electrode according to the embodiments of this application.

In another embodiment, this application provides an electronic apparatus, including the electrochemical apparatus according to the embodiments of this application.

A lithium-ion battery prepared from the negative active material of this application has improved cycle performance, deformation resistance and rate performance and reduced impedance.

Additional aspects and advantages of the embodiments of this application will be partially described and shown in the subsequent description, or explained through implementation of the embodiments of this application.

BRIEF DESCRIPTION OF DRAWINGS

Drawings necessary for describing the embodiments of this application or the prior art are briefly described below, to help describe the embodiments of this application. It is obvious that the drawings described below are only some of the embodiments of this application. Those skilled in the art may still obtain drawings of other embodiments based on the structures illustrated in these drawings without creative work.

DETAILED DESCRIPTION

Figure 1:
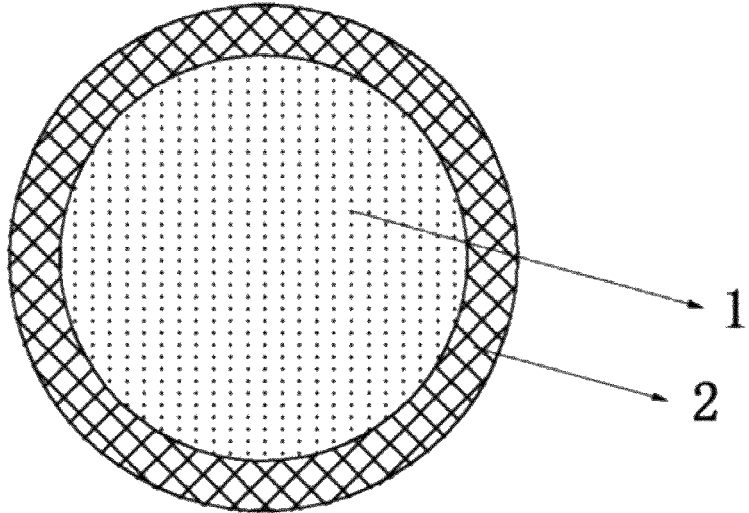
FIG. 1 shows a schematic structural diagram of a silicon-based negative active material according to an embodiment of this application.

Embodiments of this application are described in detail below. The embodiments of this application should not be construed as limitations on this application.

As is used in this application, the term "about" is used to describe and illustrate small changes. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In specific implementations and claims, a list of items connected by the terms "one of", "one piece of", "one kind of" or other similar terms may mean any one of the listed items. For example, if items A and B are listed, the phrase "one of A and B" means only A or only B. In another example, if items A, B, and C are listed, the phrase "one of A, B, and C" means only A, only B, or only C. The item A may contain a single element or a plurality of elements. The item B may contain a single element or a plurality of elements. The item C may contain a single element or a plurality of elements.

In the specific implementations and claims, an item list connected by the terms "at least one of", "at least one piece of", "at least one kind of" or other similar terms may mean any combination of the listed items. For example, if items A and B are listed, the phrase "at least one of A and B" means only A; only B; or A and B. In another example, if items A, B, and C are listed, the phrase "at least one of A, B, and C" means only A; only B; only C; A and B (exclusive of C); A and C (exclusive of B); B and C (exclusive of A); or all of A, B, and C. The item A may contain a single element or a plurality of elements. The item B may contain a single element or a plurality of elements. The item C may contain a single element or a plurality of elements.

1. Negative Electrode Material

In some embodiments, this application provides a negative electrode material. The negative electrode material includes silicon-based particles. The silicon-based particle includes a silicon-containing matrix and a polymer layer. The polymer layer is located on a surface of at least a part of the silicon-containing matrix and contains carbon nanotubes and a transition metal element. In some other embodiments, the polymer layer is located on the entire surface of the silicon-containing matrix.

In some embodiments, the transition metal element includes Co, Fe, Mg, Zn, Ni, Mn, Ti or any combination thereof, where in each silicon-based particle, a distance between a transition metal element in the transition metal element farthest from the surface of the silicon-containing matrix and the surface of the silicon-containing matrix is less than or equal to about 3 μm.

In some embodiments, in each silicon-based particle, the distance between the transition metal element in the transition metal element farthest from the surface of the silicon-containing matrix and the surface of the silicon-containing matrix is about 3 μm, about 2.5 μm, about 2 μm, about 1.5 μm, or about 1 μm, or in a range defined by any two of these values.

In some embodiments, the silicon-containing matrix includes $SiO_x$, where about $0.6 \leq x \leq$ about 1.5.

In some embodiments, the silicon-containing matrix includes Si crystal grains, SiO, $SiO_2$, SiC or any combination thereof.

In some embodiments, a particle size of Si is less than about 100 nm. In some embodiments, the particle size of Si is less than about 50 nm. In some embodiments, the particle size of Si is less than about 20 nm. In some embodiments, the particle size of Si is less than about 5 nm. In some embodiments, the particle size of Si is less than about 2 nm. In some embodiments, the particle size of Si is less than about 0.5 nm. In some embodiments, the particle size of Si is about 10 nm, about 20 nm, about 30 nm, about 40 nm, about 50 nm, about 60 nm, about 70 nm, about 80 nm, or about 90 nm, or in a range defined by any two of these values.

In some embodiments, the polymer layer includes the following polymer: carboxymethyl cellulose, polyacrylic acid, polyacrylonitrile, polyvinyl alcohol, polyvinylpyrrolidone, polyaniline, polyimide, polyamideimide, polysiloxane, polystyrene-butadiene rubber, epoxy resin, polyester resin, polyurethane resin, polyfluorene or any combination thereof.

In some embodiments, based on a total weight of the silicon-based particles, content of the polymer layer is about 0.05-15 wt %. In some embodiments, based on a total weight of the silicon-based particles, content of the polymer layer is about 1-10 wt %. In some embodiments, based on the total weight of the silicon-based particles, the content of the polymer layer is about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.2 wt %, about 1.5 wt %, about 1.7 wt %, about 2.0 wt %, about 2.5 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 14 wt %, or in a range defined by any two of these values.

In some embodiments, a thickness of the polymer layer is about 5 nm to 200 nm. In some embodiments, the thickness of the polymer layer is about 10 nm to 150 nm. In some embodiments, the thickness of the polymer layer is about 50 nm to 100 nm. In some embodiments, the thickness of the polymer layer is about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, or about 200 nm, or in a range defined by any two of these values.

In some embodiments, based on a total weight of the silicon-based particles, content of the transition metal element is about 0.005-5 wt %. In some embodiments, based on a total weight of the silicon-based particles, content of the transition metal element is about 0.1-4 wt %. In some embodiments, based on the total weight of the silicon-based particles, the content of the transition metal element is about 0.01 wt %, about 0.02 wt %, about 0.03 wt %, about 0.04 wt %, about 0.05 wt %, about 0.06 wt %, about 0.08 wt %, about 0.1 wt %, about 0.5 wt %, about 1 wt %, about 1.5 wt %, about 2 wt %, about 2.5 wt %, about 3 wt %, about 3.5 wt %, about 4 wt %, about 4.5 wt %, or about 5 wt %, or in a range defined by any two of these values.

In some embodiments, based on a total weight of the silicon-based particles, content of the carbon nanotubes is about 0.01-10 wt %. In some embodiments, based on a total weight of the silicon-based particles, content of the carbon nanotubes is about 1-8 wt %. In some embodiments, based on the total weight of the silicon-based particles, the content of the carbon nanotubes is about 0.02 wt %, about 0.05 wt %, about 0.1 wt %, about 0.3 wt %, about 0.5 wt %, about 1 wt %, about 1.5 wt %, about 2 wt %, about 2.5 wt %, about 3 wt %, about 4 wt %, about 5 wt %, about 6 wt %, about 7 wt %, about 8 wt %, about 9 wt %, or about 10 wt %, or in a range defined by any two of these values.

In some embodiments, the carbon nanotubes include single-wall carbon nanotubes, multi-wall carbon nanotubes or a combination thereof.

In some embodiments, in an X-ray diffraction pattern, a highest intensity value of the silicon-based particles is $I_2$ when 2θ is in a range of about 28.0°-29.0°, and the highest intensity value is $I_1$ when 2θ is in a range of about 20.5°-21.5°, where about $0 < I_2/I_1 \leq$ about 1. In some embodiments, the $I_2/I_1$ value is about 0.2, about 0.3, about 0.4, about 0.5, about 0.6, about 0.7, about 0.8, about 0.9, or about 1, or in a range defined by any two of these values.

In some embodiments, a diameter of the carbon nanotubes is about 2-30 nm. In some embodiments, a diameter of the carbon nanotubes is about 5-20 nm. In some embodiments, the diameter of the carbon nanotubes is about 2 nm, about 5 nm, about 10 nm, about 15 nm, about 20 nm, about 25 nm, or about 30 nm, or in a range defined by any two of these values.

In some embodiments, a length-diameter ratio of the carbon nanotubes is about 50-30000. In some embodiments, a length-diameter ratio of the carbon nanotubes is about 100-20000. In some embodiments, the length-diameter ratio of the carbon nanotubes is about 500, about 2000, about 5000, about 10000, about 15000, about 2000, about 25000, or about 30000, or in a range defined by any two of these values.

In some embodiments, an average particle size of the silicon-based particles is about 500 nm to 30 μm. In some embodiments, the average particle size of the silicon-based particles is about 1 μm to 25 μm. In some embodiments, the average particle size of the silicon-based particles is about 5 μm, about 10 μm, about 15 μm, or about 20 μm, or in a range defined by any two of these values.

In some embodiments, a specific surface area of the silicon-based particles is about 2.5-15 m²/g. In some embodiments, a specific surface area of the silicon-based particles is about 5-10 m²/g. In some embodiments, the specific surface area of the silicon-based particles is about 3

$m^2/g$, about 4 $m^2/g$, about 6 $m^2/g$, about 8 $m^2/g$, about 10 $m^2/g$, about 12 $m^2/g$, or about 14 $m^2/g$, or in a range defined by any two of these values.

In some embodiments, any one of the foregoing negative electrode materials further includes graphite particles. In some embodiments, a weight ratio of the graphite particles to the silicon-based particles is about 3:1 to 20:1. In some embodiments, the weight ratio of the graphite particles to the silicon-based particles is about 3:1, about 5:1, about 6:1, about 7:1, about 10:1, about 12:1, about 15:1, about 18:1, or about 20:1, or in a range defined by any two of these values.

2. Preparation Method of the Negative Electrode Material

Embodiments of this application provide a method for preparing any one of the foregoing negative electrode materials. The method includes:

(1) adding carbon nanotube powder into a polymer-containing solution, and dispersing it for about 1-24 hours to obtain a slurry;

(2) adding a silicon-containing matrix into the slurry, and dispersing it for about 2-4 hours to obtain a mixed slurry; and (3) removing a solvent in the mixed slurry to obtain the silicon-based particles.

In some embodiments, the method further includes a step of mixing the silicon-based particles and graphite particles. In some embodiments, a weight ratio of the graphite particles to the silicon-based particles is about 3:1, about 5:1, about 6:1, about 7:1, about 10:1, about 12:1, about 15:1, about 18:1, or about 20:1, or in a range defined by any two of these values.

In some embodiments, the silicon-containing matrix, the carbon nanotube and the polymer are defined as described above, respectively.

In some embodiments, a weight ratio of the polymer to the carbon nanotube powder is about 1:10 to 10:1. In some embodiments, the weight ratio of the polymer to the carbon nanotube powder is about 1:8, about 1:5, about 1:3, about 1:1, about 3:1, about 5:1, about 7:1, or about 10:1, or in a range defined by any two of these values.

In some embodiments, a weight ratio of the silicon-containing matrix to the polymer is about 200:1 to 5:1. In some embodiments, the weight ratio of the silicon-containing matrix to the polymer is about 150:1 to 5:1. In some embodiments, the weight ratio of the silicon-containing matrix to the polymer is about 200:1, about 150:1, about 100:1, about 50:1, about 10:1, about 1:1, or about 5:1, or in a range defined by any two of these values.

In some embodiments, the solvent includes water, ethanol, methanol, n-hexane, N,N-dimethylformamide, pyrrolidone, acetone, toluene, isopropanol or any combination thereof.

In some embodiments, the dispersion time in step (1) is about 1 hour, about 5 hours, about 10 hours, about 15 hours, about 20 hours, or about 24 hours or in a range defined by any two of these values.

In some embodiments, the dispersion time in step (2) is about 2 hours, about 2.5 hours, about 3 hours, about 3.5 hours, or about 4 hours or in a range defined by any two of these values.

In some embodiments, a method for removing the solvent in step (3) includes rotary evaporation, spray drying, filtration, freeze drying or any combination thereof.

In some embodiments, the silicon-containing matrix may be a commercially available silicon oxide $SiO_x$, or a silicon oxide $SiO_x$ which is prepared by using a method of this application and satisfies about $0 < I_2/I_1 \leq$ about 1, where the preparation method includes:

(1) mixing silicon dioxide and metal silicon powder at a molar ratio of about 1:5 to 5:1 to obtain a mixed material;

(2) heating the mixed material in a pressure range of about $10^{-4}$-$10^{-1}$ kPa and in a temperature range of about 1100-1500° C. for about 0.5-24 hours to obtain a gas;

(3) condensing the gas to obtain a solid;

(4) crushing and sieving the solid to obtain the silicon-based particles; and (5) applying heat treatment to the solid in a range of about 400-1200° C. for about 1-24 hours and cooling the heat-treated solid to obtain the silicon-based particles.

In some embodiments, a molar ratio of the silicon dioxide to the metal silicon powder is about 1:4 to 4:1. In some embodiments, the molar ratio of the silicon dioxide to the metal silicon powder is about 1:3 to 3:1. In some embodiments, the molar ratio of the silicon dioxide to the metal silicon powder is about 1:2 to 2:1. In some embodiments, the molar ratio of the silicon dioxide to the metal silicon powder is about 1:1.

In some embodiments, the pressure range is about $10^{-4}$-$10^{-1}$ kPa. In some embodiments, the pressure is about 1 Pa, about 10 Pa, about 20 Pa, about 30 Pa, about 40 Pa, about 50 Pa, about 60 Pa, about 70 Pa, about 80 Pa, about 90 Pa, or about 100 Pa, or in a range defined by any two of these values.

In some embodiments, the heating temperature is about 1100-1450° C. In some embodiments, the heating temperature is about 1200° C., about 1300° C., about 1400° C., about 1500° C., or about 1200° C., or in a range defined by any two of these values.

In some embodiments, the heating time is about 1-20 hours. In some embodiments, the heating time is about 5-15 hours. In some embodiments, the heating time is about 2 hours, about 4 hours, about 6 hours, about 8 hours, about 10 hours, about 12 hours, about 14 hours, about 16 hours, or about 18 hours or in a range defined by any two of these values.

In some embodiments, mixing is performed by using a ball mill, a V-type mixer, a three-dimensional mixer, an air-flow mixer or a horizontal mixer.

In some embodiments, heating is performed under protection of an inert gas. In some embodiments, the inert gas includes nitrogen, argon, helium or a combination thereof.

In some embodiments, the heat treatment temperature is about 400-1200° C. In some embodiments, the heat treatment temperature is about 400° C., about 600° C., about 800° C., about 1000° C., or about 1200° C., or in a range defined by any two of these values.

In some embodiments, the heat treatment time is about 1-24 hours. In some embodiments, the heat treatment time is about 2-12 hours. In some embodiments, the heat treatment time is about 2 hours, about 5 hours, about 10 hours, about 15 hours, about 20 hours or about 24 hours or in a range defined by any two of these values.

FIG. 1 shows a schematic structural diagram of a silicon-based negative active material according to an embodiment of this application. In the structure, an inner layer 1 is a silicon-containing matrix, and an outer layer 2 is a polymer layer containing carbon nanotubes. The polymer layer containing carbon nanotubes (CNT) is located on a surface of at least a part of the silicon-containing matrix, and the polymer can be used to bind the CNTs to the surface of the silicon-based negative active material, which is beneficial to improve interface stability of the CNTs on the surface of the negative active material, thereby improving their cycle performance.

A theoretical gram capacity of a silicon material is as high as about 4200 mAh/g. When used as a negative active material, the silicon material can significantly increase energy density of a battery. However, there is great volume swelling and contraction in delithiation and lithiation processes, causing the silicon-based particles to deviate from their initial positions, which in turn makes some connections in the active material ineffective. In addition, SEI is continuously and repeatedly produced on surfaces of the silicon-based particles due to volume changes and accumulated on the surfaces of the particles, resulting in increased impedance which seriously affects an effect of the silicon-based particles in practical application.

In order to resolve the above problem, in this application, silicon-based particles with a polymer layer on at least a part of the surface are prepared first, and the polymer layer contains carbon nanotubes (CNT). The carbon nanotubes are inserted into the polymer to form a three-dimensional network on a surface of the silicon-based particle with the polymer. This can not only avoid direct contact between the silicon-based particle and an electrolytic solution, but also reduce displacement caused by swelling and contraction of the silicon-based particle, thereby maintaining effective contact between the active material, and improving cycle performance of the material. In addition, the carbon nanotubes have excellent electronic conductivity. With the carbon nanotubes inserted into post-cycling by-products, internal resistance of a battery is significantly reduced, making the material exhibit excellent rate performance.

It is found by the inventors of this application that the CNT-containing polymer layer naturally contains a transition metal element. A distance between a transition metal element in the transition metal element farthest from the surface of the silicon-containing matrix and the surface of the silicon-containing matrix can reflect coating tightness of the polymer layer. When a distance between the transition metal element in the transition metal element farthest from the surface of the silicon-containing matrix and the surface of the silicon-containing matrix is less than or equal to about 3 $\mu$m, a lithium-ion battery prepared from the silicon-based particles has better cycle performance, deformation resistance and rate performance and reduced impedance.

It is also found by the inventors of this application that the $I_2/I_1$ value of the silicon-based negative active material reflects a degree of influence exerted by disproportionation of the material. A greater $I_2/I_1$ value means a greater size of nano-silicon crystal grains in the silicon-based negative active material. Under the condition that a distance between the transition metal element in the polymer layer farthest from the surface of the silicon-containing matrix and the surface of the silicon-containing matrix is less than or equal to about 3 $\mu$m, a lithium-ion battery prepared from the silicon-based negative active material has improved cycle performance and deformation resistance when the $I_2/I_1$ value satisfies $0 < I_2/I_1 \leq 1$ in comparison with when the $I_2/I_1$ value is greater than 1.

3. Negative Electrode

Embodiments of this application provide a negative electrode. The negative electrode includes a current collector and a negative active material layer located on the current collector. The negative active material layer includes the negative electrode material according to the embodiments of this application.

In some embodiments, the negative active material layer includes a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, ethyleneoxy-containing polymers, polyvinylpyrrolidone, polyurethane, polytetrafluoroethylene, polyvinylidene difluorid, polyethylene, polypropylene, styrene-butadiene rubber, acrylic (acrylate) styrene-butadiene rubber, epoxy resin or nylon.

In some embodiments, the negative active material layer includes a conductive material. In some embodiments, the conductive material includes, but is not limited to: natural graphite, artificial graphite, carbon black, acetylene black, Ketjen black, carbon fiber, metal powder, metal fiber, copper, nickel, aluminum, silver or polyphenylene derivatives.

In some embodiments, the current collector includes, but is not limited to: copper foil, nickel foil, stainless steel foil, titanium foil, foamed nickel, foamed copper or a polymer base coated with conductive metal.

In some embodiments, the negative electrode may be obtained by using the following method: mixing the active material, the conductive material and the binder in a solvent to prepare an active material composition, and applying the active material composition on the current collector.

In some embodiments, the solvent may include, but is not limited to: deionized water and N-methylpyrrolidone.

4. Positive Electrode

A material, composition, and a manufacturing method of a positive electrode that can be used in the embodiments of this application includes any technology disclosed in the prior art. In some embodiments, the positive electrode is the one described in US patent application U.S. Pat. No. 9,812,739B, which is incorporated in this application by reference in its entirety.

In some embodiments, the positive electrode includes a current collector and a positive active material layer located on the current collector.

In some embodiments, the positive active material includes, but is not limited to: lithium cobalt oxide (LiCoO$_2$), a lithium-nickel-cobalt-manganese (NCM) ternary material, lithium iron phosphate (LiFePO$_4$) or lithium manganate (LiMn$_2$O$_4$).

In some embodiments, the positive active material layer further includes a binder, and optionally includes a conductive material. The binder enhances binding between particles of the positive-electrode active material, and binding between the positive-electrode active material and the current collector.

In some embodiments, the binder includes, but is not limited to: polyvinyl alcohol, hydroxypropyl cellulose, diacetyl cellulose, polyvinyl chloride, carboxylated polyvinyl chloride, polyvinyl fluoride, ethyleneoxy-containing polymers, polyvinylpyrrolidone, polyurethane, polytetrafluoroethylene, polyvinylidene difluorid, polyethylene, polypropylene, styrene-butadiene rubber, acrylic (acrylate) styrene-butadiene rubber, epoxy resin or nylon.

In some embodiments, the conductive material includes, but is not limited to: a carbon-based material, a metal-based material, a conductive polymer and a mixture thereof. In some embodiments, the carbon-based material is selected from natural graphite, artificial graphite, carbon black, acetylene black, Ketjen black, carbon fiber or any combination thereof. In some embodiments, the metal-based material is selected from metal powder, metal fiber, copper, nickel, aluminum or silver. In some embodiments, the conductive polymer is a polyphenylene derivative.

In some embodiments, the current collector may include, but is not limited to: aluminum.

The positive electrode can be prepared by using a preparation method known in the art. For example, the positive electrode can be obtained by using the following method: mixing the active material, the conductive material and the binder in a solvent to prepare an active material composition, and applying the active material composition on the current collector. In some embodiments, the solvent may include, but is not limited to: N-methylpyrrolidone.

5. Electrolytic Solution

An electrolytic solution which can be used in the embodiments of this application may be an electrolytic solution known in the prior art.

In some embodiments, the electrolytic solution includes an organic solvent, a lithium salt and an additive. The organic solvent of the electrolytic solution according to this application may be any organic solvent known in the prior art which can be used as a solvent of the electrolytic solution. An electrolyte used in the electrolytic solution according to this application is not limited, and may be any electrolyte known in the prior art. The additive of the electrolytic solution according to this application may be any additive known in the prior art which can be used as an additive of the electrolytic solution.

In some embodiments, the organic solvent includes, but is not limited to: ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of an organic lithium salt or an inorganic lithium salt.

In some embodiments, the lithium salt includes, but is not limited to: lithium hexafluorophosphate ($LiPF_6$), lithium tetrafluoroborate ($LiBF_4$), lithium difluorophosphate ($LiPO_2F_2$), lithium bistrifluoromethanesulfonimide LiN$(CF_3SO_2)_2$(LiTFSI), lithium bis(fluorosulfonyl)imide Li(N$(SO_2F)_2$)(LiFSI), lithium bis(oxalate) borate $LiB(C_2O_4)_2$ (LiBOB) or lithium difluoro(oxalato)borate $LiBF_2(C_2O_4)$ (LiDFOB).

In some embodiments, a concentration of the lithium salt in the electrolytic solution is about 0.5-3 mol/L, about 0.5-2 mol/L or about 0.8-1.5 mol/L.

6. Separator

In some embodiments, a separator is provided between the positive electrode and the negative electrode to prevent a short circuit. A material and shape of the separator which can be used in the embodiments of this application may include any technology disclosed in the prior art. In some embodiments, the separator includes a polymer or an inorganic substance formed by a material stable to the electrolytic solution of this application.

For example, the separator may include a substrate layer and a surface treatment layer. The substrate layer is a non-woven fabric, a membrane or a composite membrane having a porous structure, and a material of the substrate layer is selected from at least one of polyethylene, polypropylene, polyethylene terephthalate and polyimide. Specifically, a polypropylene porous membrane, a polyethylene porous membrane, a polypropylene non-woven fabric, a polyethylene non-woven fabric or a polypropylene-polyethylene-polypropylene porous composite membrane can be selected.

The surface treatment layer is provided on at least one surface of the substrate layer, and the surface treatment layer may be a polymer layer or an inorganic layer, or may be a layer formed by a mixed polymer and an inorganic substance.

The inorganic layer includes inorganic particles and a binder, and the inorganic particle is selected from a combination of one or more of aluminum oxide, silicon oxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from a combination of one or more of polyvinylidene fluoride, a vinylidene fluoride-hexafluoropropylene copolymer, polyamide, polyacrylonitrile, polyacrylate, poly acrylic acid, polyacrylate, polyvinylpyrrolidone, polyvinyl ether, polymethyl methacrylate, polytetrafluoroethylene and polyhexafluoropropylene.

The polymer layer contains a polymer, and a material of the polymer is selected from at least one of polyamide, polyacrylonitrile, an acrylate polymer, polyacrylic acid, polyacrylate, polyvinylpyrrolidone, polyvinyl ether, polyvinylidene fluoride or poly(vinylidene fluoride-hexafluoropropylene).

7. Electrochemical Apparatus

Embodiments of this application provide an electrochemical apparatus, including any device where electrochemical reactions take place.

In some embodiments, the electrochemical apparatus of this application includes a positive electrode having a positive active material capable of occluding and releasing metal ions; a negative electrode according to the embodiments of this application; an electrolytic solution; and a separator placed between the positive electrode and the negative electrode.

In some embodiments, the electrochemical apparatus of this application includes, but is not limited to: all kinds of primary batteries, secondary batteries, fuel cells, solar cells or capacitors.

In some embodiments, the electrochemical apparatus is a lithium secondary battery.

In some embodiments, the lithium secondary battery includes, but is not limited to: a lithium metal secondary battery, a lithium-ion secondary battery, a lithium polymer secondary battery or a lithium-ion polymer secondary battery.

8. Electronic Apparatus

An electronic apparatus of this application may be any device using the electrochemical apparatus according to the embodiments of this application.

In some embodiments, the electronic apparatus includes, but is not limited to: notebook computers, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power supplies, motors, automobiles, motorcycles, assisted bicycles, bicycles, lighting apparatuses, toys, game machines, clocks, electric tools, flashlights, cameras, large household storage batteries or lithium-ion capacitors.

Lithium-ion batteries are taken as an example below in conjunction with specific examples to describe preparation of a lithium-ion battery. Those skilled in the art should understand that the preparation method described in this application is only an example, and any other suitable preparation methods are within the scope of this application.

EXAMPLES

Performance evaluation is carried out below based on examples and comparative examples of the lithium-ion battery of this application.

I. Test Methods

Powder Property Test Method

1. Metal element test: A given amount of sample was weighed and added into a given amount of concentrated nitric acid. Then microwave digestion was performed to obtain a solution. The obtained solution and a filter residue were washed several times and diluted to a given volume. Then, an ICP-OES test was run to measure plasma intensity of a metal element therein. Metal content in the solution was calculated based on a standard curve of the measured metal, thus obtaining an amount of the metal element in the material.

2. XRD test: 1.0-2.0 g of sample was weighed, poured into a groove of a glass sample holder, and compacted and smoothed with a glass sheet. Then, the sample was tested by using an X-ray diffractometer (Brook, D8) according to JJS K 0131-1996 "General Principles of X-Ray Diffraction Analysis", with a test voltage set to 40 kV, a current to 30 mA, a scanning angle range to 10-85°, a scanning step to 0.0167°, and a time for each step to 0.24 seconds. Then, an XRD diffraction pattern was obtained from which a highest intensity value $I_2$ when $2\theta$ is 28.4° and a highest intensity value $I_1$ when $2\theta$ is 21.0° were obtained. Then, an $I_2/I_1$ ratio was calculated.

3. Scanning electron microscope (SEM) test: SEM characterization was recorded by a PhilipsXL-30 field emission scanning electron microscope. The test was carried out under conditions of 10 kV and 10 mA.

4. Transmission electron microscope (TEM) test: TEM characterization was tested on a JEOL JEM-2010 transmission electron microscope with an operating voltage of 200 kV.

5. In each silicon-based particle, a distance (referred to as D1 below) between a transition metal element in the polymer layer farthest from a surface of a silicon-containing matrix and the surface of the silicon-containing matrix was tested as follows:

A negative electrode containing silicon-based particles was cut with scissors at any 10 different positions spread on an entire surface of the negative electrode. Then cut sections were polished by a plasma polishing machine (Leica EM TIC 3x-Ion Beam Slope Cutter). At this point, cut and polished silicon-based particles were present on the sections of the negative electrode. Then the sections of the negative electrode were placed into a scanning electron microscope (SEM) so as to find the cut silicon-based particles. The cut silicon-based particles were then cut with a focused ion beam (FIB) in a vertical direction of the sections of the negative electrode to obtain thin slices (about 50 nm) containing cross sections of the silicon-based particles. Then, the thin slices were measured by a TEM, and the distance between the transition metal element in the polymer layer farthest from the surface of the silicon-containing matrix and the surface of the silicon-containing matrix was recorded for each silicon-based particle. A distance between a transition metal element and the surface of the silicon-containing matrix was a closest vertical distance between the transition metal element and the surface of the silicon-containing matrix.

Button Battery Performance Test

In a dry argon atmosphere, $LiPF_6$ with a concentration of about 1.15 mol/L was added into a solvent obtained by mixing propylene carbonate (PC), ethylene carbonate (EC) and diethyl carbonate (DEC) (at a weight ratio of about 1:1:1) and mixed uniformly, and then about 7.5 wt % of fluoroethylene carbonate (FEC) was added and mixed uniformly to obtain an electrolytic solution.

The silicon-based negative active material, conductive acetylene black and the binder PAA (modified polyacrylic acid, PAA) obtained in the examples and comparative examples were added into deionized water at a weight ratio of about 80:10:10 and stirred to form a slurry. The slurry was applied with a scraper to form a coating with a thickness of about 100 μm, then dried in a vacuum drying oven at about 85° C. for about 12 hours and cut into a disc with a diameter of about 1 cm by using a punching machine in a dry environment. Then, in a glove box, the disc was assembled into a button battery with a metal lithium sheet as a counter electrode, a ceglard composite membrane as an separator and an added electrolytic solution.

A LAND battery tester was used to conduct a charge and discharge test on the battery. After standing for 3 hours, the battery was discharged to 0.005 V at 0.05 C and then discharged to 0.005 V at 50 μA; after standing for 5 minutes, the battery was charged to 2 V at a constant current of 0.1 C; and then, after standing for 5 minutes, the above steps were repeated twice. A charge-discharge capacity curve was obtained after the test, where an initial efficiency calculation method is capacity under a lithiation cut-off voltage of 0.8 V/capacity under a delithiation cut-off voltage of 0.005 V.

Complete Battery Performance Tests

1. High-temperature cycle performance test: At a test temperature of 45° C., the battery was charged to 4.4 V at a constant current of 0.7 C, and charged to 0.025 C at a constant voltage, followed by standing for 5 minutes, and then discharged to 3.0 V at 0.5 C. A capacity obtained in this step was an initial capacity. Then, a 0.7 C charge/0.5 C discharge cycle test was performed. A ratio of a capacity at each step to the initial capacity was calculated to obtain a capacity attenuation curve. The number of cycles was recorded when a capacity retention rate is 80% at 45° C., so as to compare high-temperature cycle performance of the batteries.

2. Fully-charged battery swelling rate test: A thickness of a half-charged fresh battery was tested with a spiral micrometer. Then, after 400 cls, a thickness of the battery fully charged was tested with the spiral micrometer and compared with the thickness of the initial half-charged fresh battery to obtain a swelling rate of the fully-charged battery.

3. Discharge rate test: At 45° C., the battery was discharged to 3.0 V at 0.2 C, followed by standing for 5 minutes, and then charged to 4.4 V at 0.5 C, and charged to 0.05 C at a constant voltage, followed by standing for 5 minutes. The discharge rate was adjusted and discharge tests were performed at 0.2 C, 0.5 C, 1 C, 1.5 C and 2.0 C respectively to obtain different discharge capacities. The capacity obtained at each rate was compared with the capacity obtained at 0.2 C to obtain a ratio, and rate performance was compared by comparing the ratios.

4. Direct current resistance (DCR) test: The actual capacity of the battery is tested with a Maccor machine at 25° C. (charged to 4.4 V at a constant current of 0.7 C, charged to 0.025 C at a constant voltage, standing for 10 minutes, discharged to 3.0 V at 0.1 C and standing for 5 minutes). The battery was discharged at 0.1 C to specific states of charge (state of charge, SOC). The discharge test was performed for 1 second with a sample collected every 5 ms, and DCR values at different SOCs were calculated.

II. Preparation of a Lithium-Ion Battery

Preparing a Positive Electrode $LiCoO_2$, conductive carbon black and polyvinylidene fluoride (PVDF) were stirred thoroughly and mixed uniformly at a weight ratio of 96.7%:1.7%:1.6% in an N-methylpyrrolidone solvent system to prepare a positive electrode slurry. The prepared positive electrode slurry was applied on a positive electrode current collector aluminum foil, dried and cold-pressed to obtain a positive electrode.

Preparing a Negative Electrode

Graphite and the silicon-based negative active material in the examples were mixed at a weight ratio of 89:11 to obtain a mixed negative active material with a gram capacity of 500 mAh/g. The mixed negative active material, a conductive agent acetylene black and PAA were stirred thoroughly and mixed uniformly at a weight ratio of 95:1.2:3.8 in deionized water, and the resulting mixture was applied on a Cu foil, dried and cold-pressed to obtain a negative pole piece.

Preparing an Electrolytic Solution

In a dry argon atmosphere, $LiPF_6$ with a concentration of about 1 mol/L was added into a solvent obtained by mixing propylene carbonate (PC), ethylene carbonate (EC) and diethyl carbonate (DEC) (at a weight ratio of about 1:1:1) and mixed uniformly, and then 10 wt % of fluoroethylene carbonate (FEC) was added and mixed uniformly to obtain an electrolytic solution.

Preparing a Separator

A polyethylene (PE) porous polymer film was used as a separator.

Preparing a Lithium-Ion Battery

The positive electrode, the separator and the negative electrode were stacked in order so that the separator is located between the positive electrode and the negative electrode to achieve a separation effect. Winding was performed to obtain a bare cell. The bare cell was put into an outer package, and packaged with the electrolytic solution injected. Then, after chemical conversion, degassing, trimming and other technological processes, a lithium-ion battery was obtained.

III. Preparation of a Silicon-Based Negative Active Material

1. The silicon-based negative active materials in Examples 1-8 and Comparative Examples 1-3 were prepared in the following method:

(1) performing mechanical dry mixing and ball mill mixing for silicon dioxide and metal silicon powder at a molar ratio of 1:1 to obtain a mixed material;

(2) heating the mixed material in an $Ar_2$ atmosphere at a pressure of 10 Pa and at a temperature of 1350° C. for 20 hours to obtain a gas;

(3) condensing the gas to obtain a solid, and crushing and sieving the solid to obtain a silicon-containing matrix material with Dv50 of 5.6 μm and an $I_2/I_1$ value of 0.41;

(4) dispersing carbon nanotubes and a polymer in water at a high speed for 12 hours to obtain a uniformly mixed slurry;

(5) adding the silicon-containing matrix material obtained in step (3) into the uniformly mixed slurry in step (4), and stirring them for 4 hours to obtain a uniformly mixed dispersion;

(6) spray drying the dispersion (with an inlet temperature of about 200° C. and an outlet temperature of about 110° C.) to obtain powder; and (7) taking out a powder sample after cooling, and crushing and sieving the powder sample with a 400-mesh sieve to obtain silicon-based particles to serve as the silicon-based negative active material.

Table 1-1 shows the types and added amounts of various substances used in the preparation method of the silicon-based negative active materials in Examples 1-8 and Comparative Examples 1-3.

TABLE 1-1

| Number | Silicon-containing matrix material | Added amount of CNT | Type of polymer | Added amount of polymer |
|---|---|---|---|---|
| Example 1 | 100 g | 1 g | Carboxymethyl cellulose | 0.5 g |
| Example 2 | 100 g | 1 g | Carboxymethyl cellulose | 1 g |
| Example 3 | 100 g | 1 g | Carboxymethyl cellulose | 1.5 g |
| Example 4 | 100 g | 1 g | Carboxymethyl cellulose | 2 g |
| Example 5 | 100 g | 0.3 g | Carboxymethyl cellulose | 1 g |
| Example 6 | 100 g | 2.5 g | Carboxymethyl cellulose | 1 g |
| Example 7 | 100 g | 1 g | Carboxymethyl cellulose | 1 g |
| Example 8 | 100 g | 1 g | Carboxymethyl cellulose | 1 g |
| Comparative Example 1 | 100 g | 1 g | Carboxymethyl cellulose | 5 g |
| Comparative Example 2 | 100 g | 4 g | Carboxymethyl cellulose | 1 g |
| Comparative Example 3 | 100 g | 1 g | Carboxymethyl cellulose | 1 g |

Table 1-2 shows relevant performance parameters of the silicon-based negative active materials in Examples 1-8 and Comparative Examples 1-3. The content of each substance in Table 1-2 was calculated based on a total weight of the silicon-based negative active material.

TABLE 1-2

| Number | Type and content of the transition metal element in the polymer layer (wt %) | Gram capacity */mAh · g⁻¹ | Initial efficiency/ % | D1 (µm) | Specific surface area (m²/g) |
|---|---|---|---|---|---|
| Example 1 | Fe: 0.03 | 1571 | 68.7 | 0.05 | 1.82 |
| Example 2 | Fe: 0.03 | 1552 | 68.7 | 0.2 | 2.20 |
| Example 3 | Fe: 0.03 | 1443 | 64.1 | 1.2 | 2.48 |
| Example 4 | Fe: 0.03 | 1324 | 61.3 | 2.4 | 2.64 |
| Example 5 | Fe: 0.03 | 1568 | 65.3 | 0.2 | 1.73 |
| Example 6 | Fe: 0.03 | 1517 | 63.6 | 0.2 | 2.76 |
| Example 7 | Fe: 0.05 | 1551 | 68.6 | 0.2 | 2.27 |
| Example 8 | Fe: 0.08 | 1569 | 68.5 | 0.2 | 2.28 |
| Comparative Example 1 | Fe: 0.03 | 1324 | 58.5 | 4 | 3.34 |
| Comparative Example 2 | Fe: 0.03 | 1421 | 60.6 | 0.2 | 2.96 |
| Comparative Example 3 | Fe: 0.4 | 1488 | 62.5 | 0.2 | 1.93 |

*The gram capacity is a capacity obtained when a delithiation cut-off voltage is 2.0 V. The same applies below.
*An initial efficiency calculation method is capacity at a delithiation cut-off voltage of 0.8 V/capacity at a lithiation cut-off voltage of 0.005 V. The same applies below.

Table 1-3 shows relevant performance parameters of the silicon-based negative active materials in Examples 1-8 and Comparative Examples 1-3.

TABLE 1-3

| Number | Number of cycles when capacity was reduced to 80% | Fully-charged swelling rate of the battery after 400 cycles | Rate (2 C discharge capacity/ 0.2 C discharge capacity) | DCR (value obtained under 10% SOC at room temperature, mΩ) |
|---|---|---|---|---|
| Example 1 | 514 | 7.3% | 91.9% | 64 |
| Example 2 | 544 | 6.2% | 92.9% | 64 |
| Example 3 | 496 | 7.8% | 89.4% | 67 |
| Example 4 | 472 | 8.9% | 86.3% | 72 |
| Example 5 | 486 | 8.2% | 86.4% | 71 |
| Example 6 | 461 | 6.1% | 91.1% | 65 |
| Example 7 | 540 | 6.2% | 92.7% | 64 |
| Example 8 | 535 | 6.3% | 92.4% | 64 |
| Comparative Example 1 | 412 | 10.9% | 82.3% | 87 |
| Comparative Example 2 | 351 | 5.1% | 90.1% | 67 |
| Comparative Example 3 | 205 | 14.3% | 88.4% | 84 |

A maximum distance between the transition metal element in the polymer layer on the surface of the silicon-containing matrix and the surface of the silicon-containing matrix reflects the tightness of the polymer layer. With the same type and amount of silicon-containing matrix, the same type and amount of polymer and the same amount of carbon nanotubes, a greater distance between the transition metal element in the polymer layer farthest from the surface of the silicon-containing matrix and the surface of the silicon-containing matrix indicates a looser and thicker polymer layer. Otherwise, a denser and thinner polymer layer is indicated.

It can be seen from the test results of Examples 1-8 and Comparative Examples 1-3 that, with the same type and amount of silicon-containing matrix, the same type and amount of polymer and the same amount of carbon nanotubes, a lithium-ion battery prepared from the silicon-based negative active material had improved cycle performance, deformation resistance and rate performance and reduced impedance when a distance between the transition metal element in the polymer layer farthest from the surface of the silicon-containing matrix and the surface of the silicon-containing matrix was less than 3 µm.

2. The silicon-based negative active materials in Examples 9-12 and Comparative Example 4 were prepared in the following method:

(1) dispersing carbon nanotubes and a polymer in water at a high speed for 12 hours to obtain a uniformly mixed slurry;

(2) adding a silicon-containing matrix material SiC (Dv50=8 µm) into the uniformly mixed slurry in step (1) and stirring them for 4 hours to obtain a uniformly mixed dispersion;

(3) spray drying the dispersion (with an inlet temperature of about 200° C. and an outlet temperature of about 110° C.) to obtain powder; and (4) taking out a powder sample after cooling, and crushing and sieving the powder sample with a 400-mesh sieve to obtain silicon-based particles to serve as the silicon-based negative active material.

Table 2-1 shows the types and added amounts of various substances used in the preparation method of the silicon-based negative active materials in Examples 9-12 and Comparative Example 4.

TABLE 2-1

| Number | Silicon-containing matrix material | Added amount of CNT | Type of polymer | Added amount of polymer |
|---|---|---|---|---|
| Example 9 | SiC: 100 g | 1 g | Carboxymethyl cellulose | 0.5 g |
| Example 10 | SiC: 100 g | 1 g | Carboxymethyl cellulose | 1 g |
| Example 11 | SiC: 100 g | 1 g | Carboxymethyl cellulose | 1.5 g |
| Example 12 | SiC: 100 g | 1 g | Carboxymethyl cellulose | 2 g |
| Comparative Example 4 | SiC: 100 g | 1 g | Carboxymethyl cellulose | 4 g |

Table 2-2 shows relevant performance parameters of the silicon-based negative active materials in Examples 9-12 and Comparative Example 4. The content of each substance in Table 2-2 was calculated based on a total weight of the silicon-based negative active material.

TABLE 2-2

| Number | Type and content of the transition metal element in the polymer layer (wt %) | Gram capacity */mAh · g⁻¹ | Initial efficiency/ % | D1 (µm) | Specific surface area (m²/g) |
|---|---|---|---|---|---|
| Example 9 | Fe: 0.03 | 845 | 90.1 | 0.05 | 1.85 |
| Example 10 | Fe: 0.03 | 838 | 89.2 | 0.2 | 2.13 |
| Example 11 | Fe: 0.03 | 826 | 88.5 | 1.2 | 2.45 |
| Example 12 | Fe: 0.03 | 815 | 87.1 | 2.4 | 2.66 |
| Comparative Example 4 | Fe: 0.03 | 779 | 85.3 | 4 | 3.25 |

Table 2-3 shows relevant performance parameters of the silicon-based negative active materials in Examples 9-12 and Comparative Example 4.

TABLE 2-3

| Number | Number of cycles when capacity was reduced to 80% | Fully-charged swelling rate of the battery after 300 cycles | Rate (2 C discharge capacity/ 0.2 C discharge capacity) | DCR (value obtained under 10% SOC at room temperature, mΩ) |
|---|---|---|---|---|
| Example 9 | 407 | 11.7% | 89.8% | 70 |
| Example 10 | 425 | 10.6% | 90.8% | 68 |
| Example 11 | 383 | 12.0% | 87.1% | 73 |
| Example 12 | 368 | 12.8% | 85.1% | 78 |
| Comparative Example 4 | 264 | 13.8% | 82.1% | 89 |

It can be seen from the test results of Examples 9-12 and Comparative Example 4 that, when SiC was used as the silicon-containing matrix, with the same type and amount of silicon-containing matrix, the same type and amount of polymer and the same amount of carbon nanotubes, a lithium-ion battery prepared from the silicon-based negative active material had improved cycle performance, deformation resistance and rate performance and reduced impedance when the distance between the transition metal element in the polymer layer farthest from the surface of the silicon-containing matrix and the surface of the silicon-containing matrix was less than 3 μm. This rule is consistent with that when a silicon oxide is used as the silicon-containing matrix.

3. The silicon-based negative active materials in Examples 15-16 and Comparative Example 5 were prepared in the following method:

(1) performing mechanical dry mixing and ball mill mixing for silicon dioxide and metal silicon powder at a molar ratio of 1:1 to obtain a mixed material;

(2) heating the mixed material in an $Ar_2$ atmosphere in a pressure range of $10^{-3}$-$10^{-1}$ kPa and in a temperature range of 1100-1500° C. for 0.5-24 hours to obtain a gas;

(3) condensing the gas to obtain a solid, and crushing and sieving the solid; and (4) applying heat treatment to the solid in a nitrogen atmosphere in a range of 400-1200° C. for 1-24 hours, and cooling the heat-treated solid to obtain silicon-containing matrix materials with different $I_2/I_1$ values and an average particle size Dv50 of 5.3 μm;

(5) dispersing carbon nanotubes and a polymer in water at a high speed for 12 hours to obtain a uniformly mixed slurry;

(6) adding the silicon-containing matrix material obtained in step (4) into the uniformly mixed slurry in step (5) and stirring them for 4 hours to obtain a uniformly mixed dispersion;

(7) spray drying the dispersion (with an inlet temperature of about 200° C. and an outlet temperature of about 110° C.) to obtain powder; and (8) taking out a powder sample after cooling, and crushing and sieving the powder sample with a 400-mesh sieve to obtain silicon-based particles to serve as the silicon-based negative active material.

Table 3-1 shows specific processing parameters of steps (1) to (4) in the preparation method of the silicon-based negative active materials in Examples 15-16 and Comparative Example 5.

TABLE 3-1

| Number | Pressure (Pa) | Heating temperature (° C.) | Heating time (h) | Classification treatment | Heat treatment after classification |
|---|---|---|---|---|---|
| Example 15 | 10 | 1350 | 20 | Jet crushing + multi-stage classification | 600° C., 2 h |
| Example 16 | 10 | 1350 | 20 | Jet crushing + multi-stage classification | 800° C., 2 h |
| Comparative Example 5 | 10 | 1350 | 20 | Jet crushing + multi-stage classification | 1000° C., 2 h |

Table 3-2 shows the types and added amounts of various substances used in steps (5) to (6) of the preparation method of the silicon-based negative active materials in Examples 15-16 and Comparative Example 5.

TABLE 3-2

| Number | Silicon-containing matrix material | Added amount of CNT | Type of polymer | Added amount of polymer |
|---|---|---|---|---|
| Example 15 | 100 g | 1 g | Carboxymethyl cellulose | 1 g |
| Example 16 | 100 g | 1 g | Carboxymethyl cellulose | 1 g |
| Comparative Example 5 | 100 g | 1 g | Carboxymethyl cellulose | 1 g |

Table 3-3 shows relevant performance parameters of the silicon-based negative active materials in Example 2, Examples 15-16 and Comparative Example 5. The content of each substance in Table 3-3 was calculated based on a total weight of the silicon-based negative active material.

TABLE 3-3

| Number | $I_2/I_1$ value | Type and content of the transition metal element in the polymer layer (wt %) | Gram capacity*/ mAh · g$^{-1}$ | Initial efficiency/ % | D1 (µm) | Specific surface area (m$^2$/g) |
|---|---|---|---|---|---|---|
| Example 2 | 0.41 | Fe: 1 | 1552 | 68.7 | 0.2 | 2.20 |
| Example 15 | 0.64 | Fe: 1 | 1548 | 68.5 | 0.2 | 2.21 |
| Example 16 | 1 | Fe: 1 | 1537 | 67.9 | 0.2 | 2.10 |
| Comparative Example 5 | 2.5 | Fe: 1 | 1542 | 68.6 | 0.2 | 2.34 |

Table 3-3 shows relevant performance parameters of the silicon-based negative active materials in Example 2, Examples 15-16 and Comparative Example 5.

TABLE 3-3

| Number | Number of cycles when capacity was reduced to 80% | Fully-charged swelling rate of the battery after 300 cycles | Rate (2 C discharge capacity/ 0.2 C discharge capacity) | DCR (value obtained under 10% SOC at room temperature, mΩ) |
|---|---|---|---|---|
| Example 2 | 544 | 6.2% | 92.9% | 64 |
| Example 15 | 531 | 7.6% | 92.8% | 64 |
| Example 16 | 523 | 8.5% | 92.2% | 65 |
| Comparative Example 5 | 478 | 9.8% | 92.4% | 65 |

The $I_2/I_1$ value reflects a degree of influence by disproportionation of the material. The greater $I_2/I_1$ value indicates the greater size of nano-silicon crystal grains in the negative active material. It can be seen from the performance test results of Example 2, Examples 15-16 and Comparative Example 5 that under the condition that a distance between the transition metal element in the polymer layer farthest from the surface of the silicon-containing matrix and the surface of the silicon-containing matrix was less than 3 µm, a lithium-ion battery prepared from the silicon-based negative active material had improved cycle performance and deformation resistance when the $I_2/I_1$ value satisfied $0 < I_2/I_1 \leq 1$ in comparison with when the $I_2/I_1$ value was greater than 1. The reason is that when the $I_2/I_1$ value was greater than 1, the stress in a local area of the negative active material was increased rapidly in a lithiation process, leading to structural deterioration of the negative active material during cycling. In addition, due to occurrence of nanocrystalline distribution, a grain boundary diffusion ability in an ion diffusion process was affected.

Figure 2:
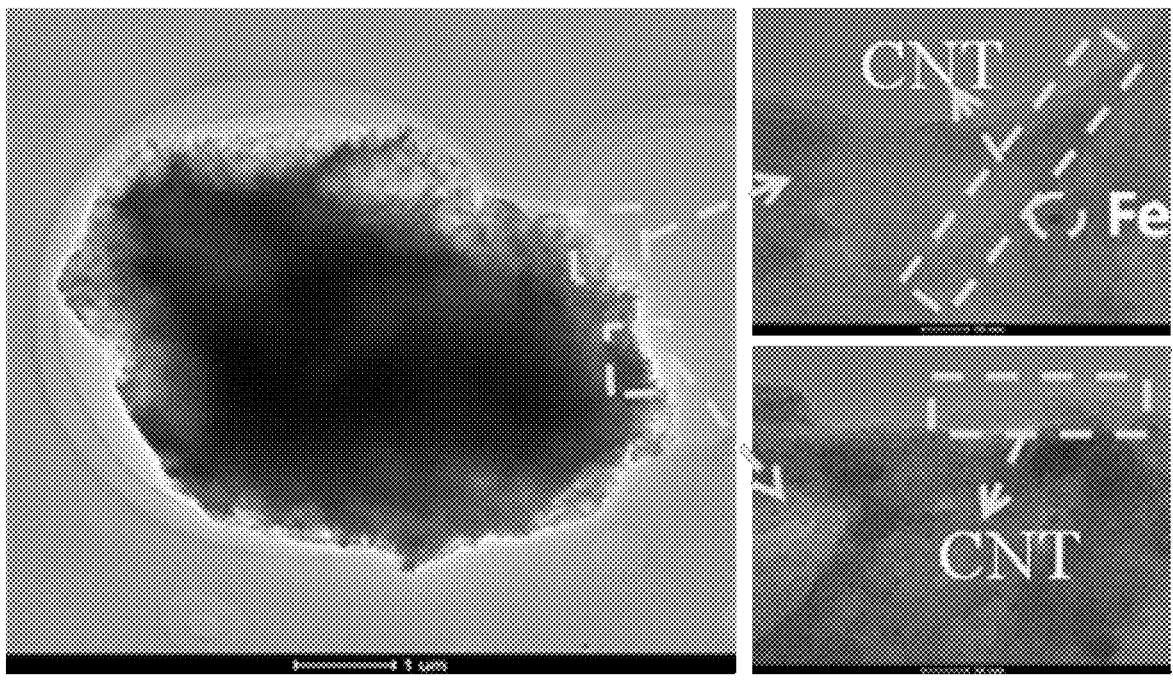
FIG. 2 shows a transmission electron microscope (TEM) image of a surface of a silicon-based negative active material in Example 2 of this application.
Figure 3:
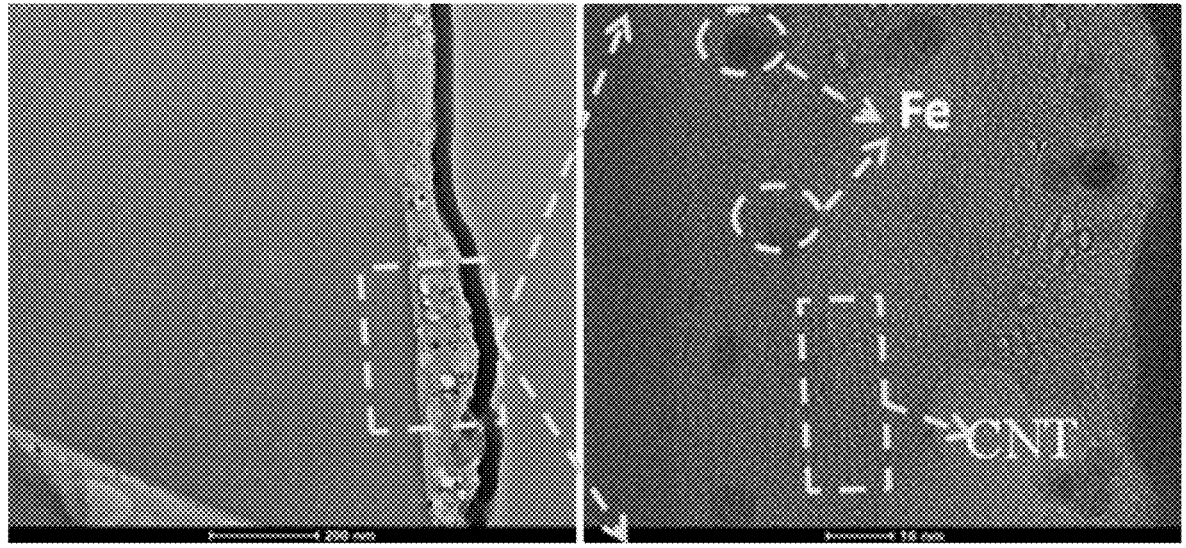
FIG. 3 shows a TEM image of a silicon-based negative active material sliced with a focused ion beam (FIB for short) in Example 2 of this application.

FIG. 2 shows a transmission electron microscope (TEM) image of the surface of the silicon-based negative active material in Example 2 of this application. CNTs and the element Fe can be seen present in a partially enlarged view provided in FIG. 2. FIG. 3 shows a TEM image of the silicon-based negative active material sliced with an FIB in Example 2 of this application. CNTs and the element Fe can be seen present in a partially enlarged view provided in FIG. 3.

References to "some embodiments", "some of the embodiments", "an embodiment", "another example", "examples", "specific examples" or "some examples" in the specification mean the inclusion of specific features, structures, materials, or characteristics described in the embodiment or example in at least one embodiment or example of this application. Therefore, descriptions in various places throughout the specification, such as "in some embodiments", "in the embodiments", "in an embodiment", "in another example", "in an example", "in a specific example" or "examples", do not necessarily refer to the same embodiment or example in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

What is claimed is:

1. A negative electrode material, comprising: silicon-based particles, wherein each silicon-based particle comprises a silicon-containing matrix and a polymer layer, and the polymer layer is located on a surface of at least a part of the silicon-containing matrix and contains carbon nanotubes and a transition metal element;

wherein the polymer layer comprises the following polymer: polyacrylonitrile, polyvinyl alcohol, polyvinylpyrrolidone, polyaniline, polyimide, polyamideimide, polysiloxane, polystyrene-butadiene rubber, epoxy resin, polyester resin, polyurethane resin, polyfluorene or any combination thereof;

wherein, in the each silicon-based particle, a distance from the transition metal element farthest from the surface of the silicon-containing matrix to the surface of the silicon-containing matrix is between about 0.2 µm and about 3 µm.

2. The negative electrode material according to claim 1, wherein the transition metal element comprises Co, Fe, Mg, Zn, Ni, Mn, Ti or any combination thereof.

3. The negative electrode material according to claim 1, wherein, based on a total weight of the silicon-based particles, a content of the transition metal element is about 0.005-5 wt %.

4. The negative electrode material according to claim 1, wherein the silicon-containing matrix comprises SiO$_x$, and $0.6 \leq x \leq 1.5$.

5. The negative electrode material according to claim 1, wherein the silicon-containing matrix comprises Si, SiO, SiO$_2$, SiC or any combination thereof.

6. The negative electrode material according to claim 5, wherein a grain size of Si is less than about 100 nm.

7. The negative electrode material according to claim 1, wherein based on a total weight of the silicon-based particles, a content of the polymer layer is about 0.05-15 wt %.

8. The negative electrode material according to claim 1, wherein a content of the carbon nanotubes is about 0.01-10 wt %.

9. The negative electrode material according to claim 1, wherein in an X-ray diffraction pattern, a highest intensity value of the silicon-based particles is $I_2$ when $2\theta$ is in a range of about 28.0°-29.0°, and the highest intensity value is $I_1$ when $2\theta$ is in a range of about 20.5°-21.5°, wherein about $0 < I_2/I_1 \leq$ about 1.

10. The negative electrode material according to claim 1, wherein an average particle size of the silicon-based particles is about 500 nm to 30 μm.

11. The negative electrode material according to claim 1, wherein a specific surface area of the silicon-based particles is about 1-50 m²/g.

12. The negative electrode material according to claim 1, wherein a thickness of the polymer layer is 50 nm to 100 nm.

13. The negative electrode material according to claim 1, wherein the distance from the transition metal element farthest from the surface of the silicon-containing matrix to the surface of the silicon-containing matrix is between about 1 μm and about 3 μm.

14. A negative electrode, comprising: a negative electrode material, the negative electrode material comprises silicon-based particles, wherein each silicon-based particle comprises a silicon-containing matrix and a polymer layer, and the polymer layer is located on a surface of at least a part of the silicon-containing matrix and contains carbon nanotubes and a transition metal element;

wherein the polymer layer comprises the following polymer: polyacrylonitrile, polyvinyl alcohol, polyvinylpyrrolidone, polyaniline, polyimide, polyamideimide, polysiloxane, polystyrene-butadiene rubber, epoxy resin, polyester resin, polyurethane resin, polyfluorene or any combination thereof;

wherein, in the each silicon-based particle, a distance from the transition metal element farthest from the surface of the silicon-containing matrix to the surface of the silicon-containing matrix is between about 0.2 μm and about 3 μm.

15. The negative electrode according to claim 14, wherein the transition metal element comprises Co, Fe, Mg, Zn, Ni, Mn, Ti or any combination thereof.

16. The negative electrode according to claim 14, wherein based on a total weight of the silicon-based particles, a content of the transition metal element is about 0.005-5 wt %.

17. The negative electrode according to claim 14, wherein a thickness of the polymer layer is 50 nm to 100 nm.

18. An electrochemical apparatus, comprising the negative electrode according to claim 14.

19. An electronic apparatus, comprising the electrochemical apparatus according to claim 18.

* * * * *